Oct. 30, 1956  G. S. TRIMBLE, JR., ET AL  2,768,526
SIX COMPONENT BALANCE FOR WIND TUNNELS
Filed July 12, 1950  5 Sheets-Sheet 1

INVENTORS
GEORGE S. TRIMBLE JR.
LEWIS G. COOPER,
WERNER F. HESS,
BY
ATTORNEY

Oct. 30, 1956     G. S. TRIMBLE, JR., ET AL     2,768,526
SIX COMPONENT BALANCE FOR WIND TUNNELS
Filed July 12, 1950     5 Sheets-Sheet 2
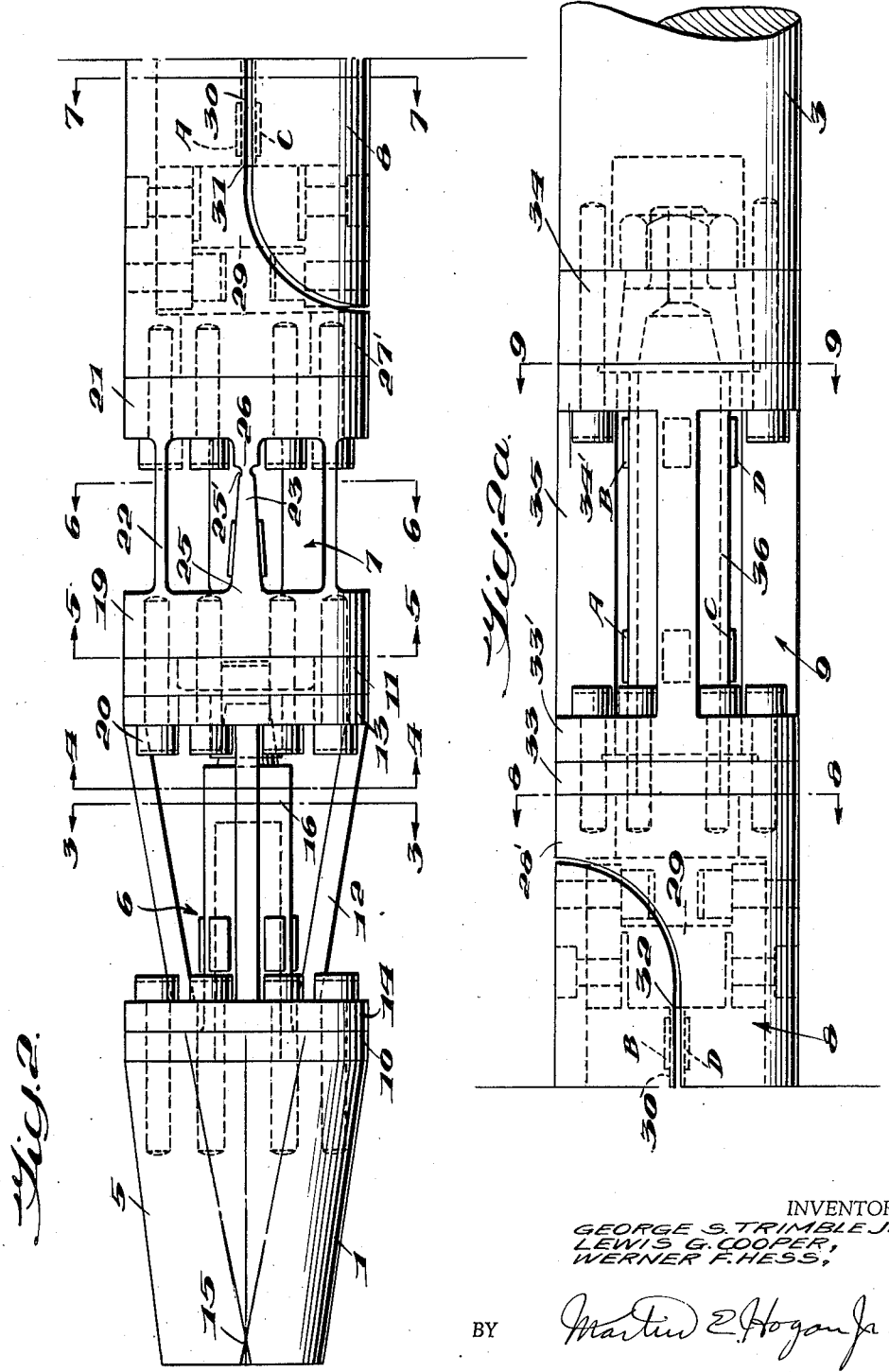
INVENTORS
GEORGE S. TRIMBLE JR.
LEWIS G. COOPER,
WERNER F. HESS,
BY
ATTORNEY

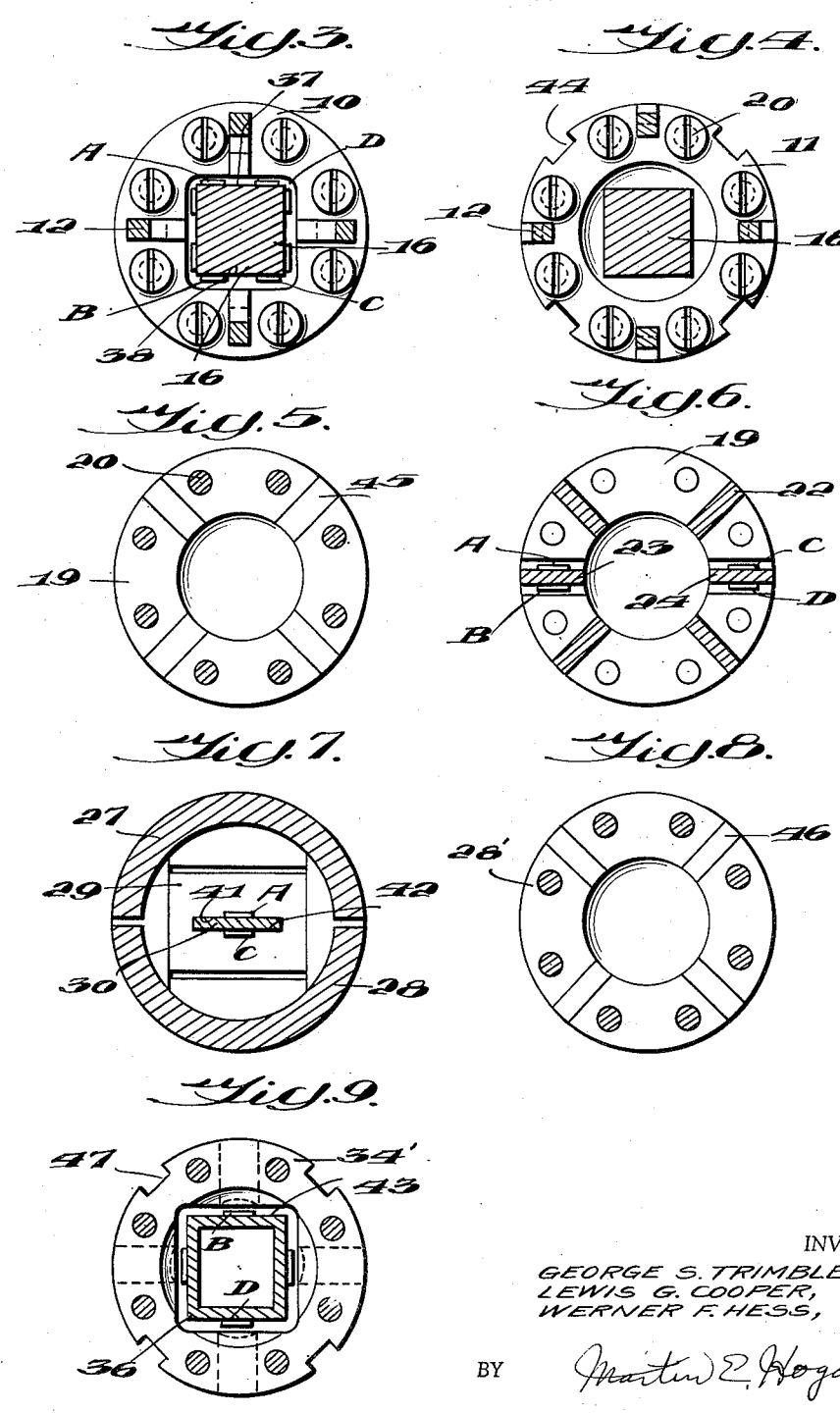

Oct. 30, 1956   G. S. TRIMBLE, JR., ET AL   2,768,526
SIX COMPONENT BALANCE FOR WIND TUNNELS
Filed July 12, 1950   5 Sheets-Sheet 4

INVENTORS
GEORGE S. TRIMBLE JR.
LEWIS G. COOPER,
WERNER F. HESS,
BY Martin E. Hogan Jr.
ATTORNEY Oct. 30, 1956   G. S. TRIMBLE, JR., ET AL   2,768,526
SIX COMPONENT BALANCE FOR WIND TUNNELS
Filed July 12, 1950   5 Sheets-Sheet 5

INVENTORS
GEORGE S. TRIMBLE JR.
LEWIS G. COOPER,
WERNER F. HESS,
BY *Martin E. Hogan Jr.*
ATTORNEY

United States Patent Office 2,768,526
Patented Oct. 30, 1956

2,768,526

SIX COMPONENT BALANCE FOR WIND TUNNELS

George S. Trimble, Jr., Towson, and Lewis G. Cooper and Werner F. Hess, Middle River, Md., assignors to The Glenn L. Martin Company, Middle River, Md., a corporation of Maryland Application July 12, 1950, Serial No. 173,284

15 Claims. (Cl. 73—147)

This invention relates to balance systems for measuring forces and moments acting on a model such as in a wind tunnel and more particularly to a strain gauge balance system, specially adapted for supersonic work, which is capable of measuring the resultant forces and moments in terms of certain components, simultaneously and by direct reading.

There are six components of the resultant force and moment in which the aerodynamicist is interested when analyzing the flying qualities of an aircraft. These six components are well known and recognized by those familiar with the art, as pitching moment, yawing moment, rolling moment, drag force, lift force and side force. By determining the magnitude of these components acting on a scale model in a wind tunnel, certain design parameters can be obtained which will apply to the full scale aircraft. The efficient design of modern aircraft demands accurate and extensive wind tunnel testing.

There are three general types of wind tunnel balances in use today for determining the magnitude of the force and moment components acting on a model in a wind tunnel. They are the lever-type balance, the wire suspension type balance and the hydraulic type balance.

The lever-type balance is essentially a four-component system, and in order to measure all six components, it is necessary to change the model mounting position. Due to its size, this type balance system is carried outside the tunnel walls. To eliminate errors resulting from leakage in the working section of the tunnel, the balance is enclosed in a pressuretight chamber and maintained at a pressure equal to that of the working section. Although this system is satisfactory for ordinary subsonic work, its large pressurized chamber and limited capacity make it undesirable for use in high subsonic and supersonic tunnels.

The wire suspension type balance is an economical system capable of measuring all six components, and is used effectively in small subsonic wind tunnels. This, however, like the lever type system is unsatisfactory for supersonic work. The suspension wires within the tunnel cause shock waves which disturb the flow pattern and seriously affect the forces acting on the model.

The hydraulic type balance, while it can measure all six components, is a heavy and bulky structure, insensitive to certain force and moment components. This system is seriously affected by temperature variations, an inherent factor in supersonic work. The large size of this balance makes it necessary to employ a separate pressurized chamber as in the lever type system which additionally complicates the structure and makes it unsatisfactory for high speed wind tunnel testing.

From the preceding discussion, it is obvious that the three types of balance systems now in use are unsatisfactory for use in supersonic wind tunnel work. A desirable balance system for such an application must be such that it will not interfere with the airflow around the model, it should measure all six components simultaneously so as to enable completion of the tests in as short a time as possible, it should be direct reading, the resulting data must be extremely accurate, and the system should be adaptable to automatic recording. All of these features are embodied in the strain gauge balance of this invention.

It is an object of this invention to provide a strain gauge balance adapted to be entirely enclosed within a model. This eliminates the need for a separate pressurized chamber and eliminates disturbance of the flow pattern accompanied by adverse effects on the model.

Another object of this invention is to provide a strain gauge balance capable of measuring all six force and moment components acting on a model simultaneously and by direct reading, thus considerably reducing the time required to complete a test.

Another object of this invention is to provide a strain gauge balance which directly and independently measures each of the desired forces and moments without the need for corrections due to interaction therebetween.

Another object of this invention is to provide a strain gauge balance which may support the model from the rear, thereby eliminating support interference effects.

Further and other objects will become apparent from the accompanying description and drawings which form a part of this disclosure and in which like numerals refer to like parts.

In the drawing:

Figure 1 shows the strain gauge balance supported within a wind tunnel, wherein the balance is completely enclosed within the body of the model.

Figures 2 and 2a taken together, constitute a side view of the strain gauge balance of this invention.

Figures 3 through 9 are transverse sectional views taken on the lines 3—3 through 9—9 respectively, of Figure 2.

Figure 1:
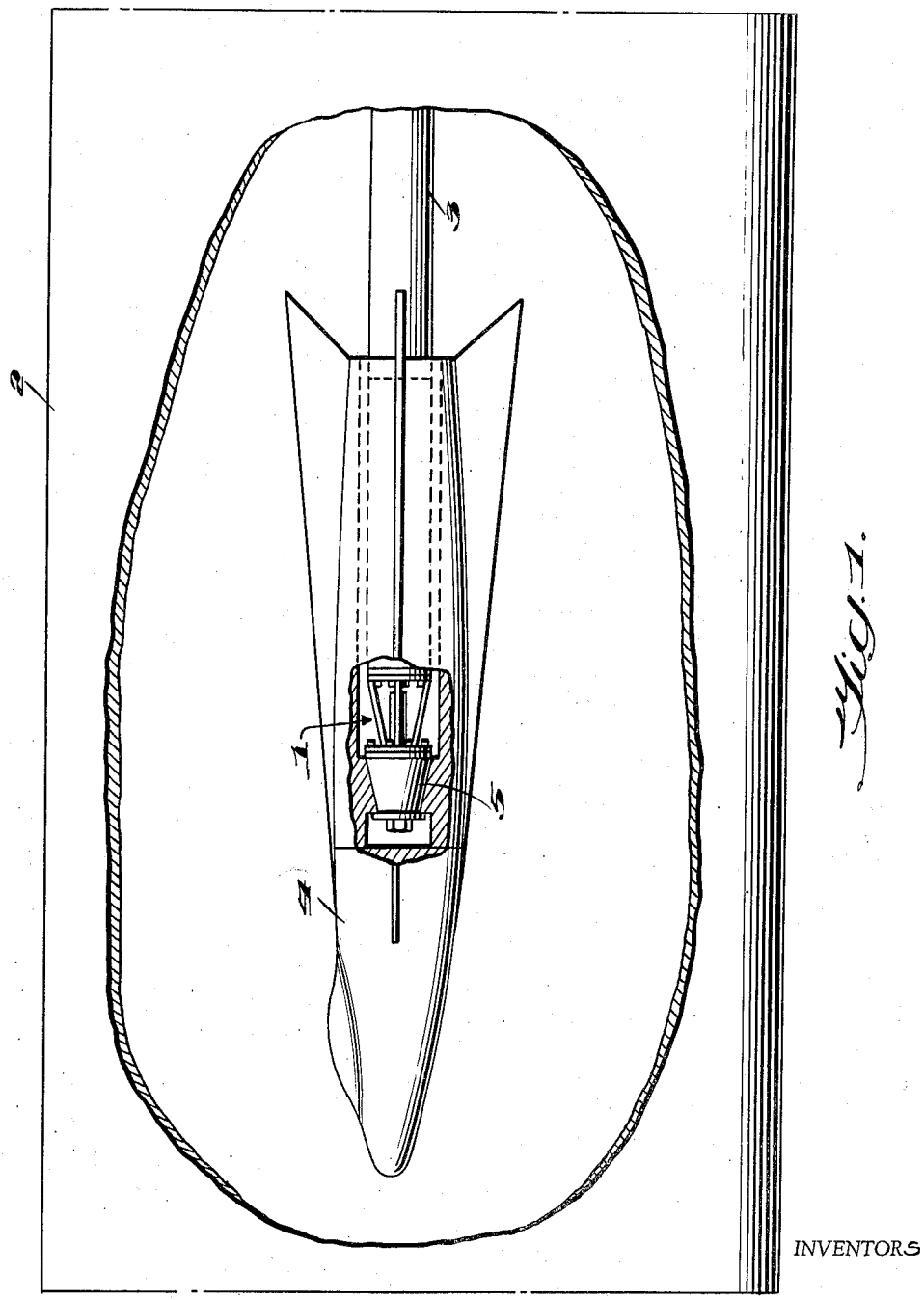

Strain gauge balance 1, shown in Figure 1 within a high-speed wind tunnel 2, is supported at its rearwardmost end by a sting 3, rigidly carried by tunnel 2. Balance 1 extends into a cylindrical aperture formed in the body of model 4 and is rigidly secured thereto through the conical tip portion 5 adjacent its forwardmost end in such a manner that any resultant forces and moments acting on the model will be transferred to the balance. These resultant forces and moments are then resolved into desired force and moment components by balance 1, the magnitudes of which are directly readable without the need for corrections due to interaction.

The construction of strain gauge balance 1, as shown most completely in Figures 2 and 2a, includes four cages, 6, 7, 8 and 9, coaxially aligned and securely connected to one another so as to transmit forces and moments from one cage to the other. Each cage has a pair of bulkheads spaced apart and generally parallel to one another. These pairs of bulkheads, specifically described hereinbelow, are joined by legs adapted to allow relative movement of those bulkheads upon application of certain forces or moments and to resist deflections upon application of other forces or moments.

Figure 10:
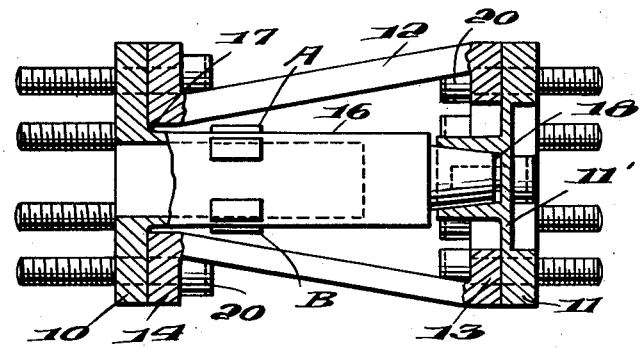
Figure 10 is a longitudinal sectional view of the pitch and yawing moment cage.

Pitch and yawing moment cage 6 located at the forwardmost end of balance 1 includes bulkheads 10 and 11 spaced coaxially apart and generally parallel to one another and joined by legs 12. Legs 12 are rigidly connected to bulkheads 10 and 11 by means of ring elements 13 and 14 formed integral with the legs and suitably rigidly connected as by machine screws 20 to the bulkheads. As best shown in Figures 2 and 10, legs 12 converge so that their axes intersect at a point 15 lying on the longitudinal axis of the assembly and located beyond bulkhead 10. Interposed between bulkheads 10 and 11 and legs 12, a beam 16, substantially square in cross-section as shown in Figure 3, is fixedly attached at 17 to bulkhead 10 as best shown in Figure 10. The other end 18 of beam 16 is rigidly secured to a diaphragm 11' which forms an integral part of bulkhead 11. The construction of diaphragm 11' is such that beam 16 will develop substantially no moment at end 18 when bulkheads 10 and 11 are moved with respect to one another. This effectively results in a cantilever beam fixed at 17 and pinned at 18 so that the moment, due to a displacement, varies along the span from near zero at end 18 to a maximum at end 17. By applying the forces and moments developed by the model at the focal point or resolving center 15 designated by the point at which the axes of the legs converge, any forces which are developed will be resisted by tension and compression in legs 12. Since a column is very strong in pure tension and compression, substantially no deflections will occur in cage 6 from that type of loading. A rolling moment produced by the model acting at the resolving center 15 will tend to rotate bulkhead 10 with respect to bulkhead 11, but such movement is effectively resisted by legs 12. If the rolling moment did induce stresses in beam 16, due to its being abnormally high, the means by which the deflections are measured will not respond to such a loading condition as set forth hereinbelow. By applying a pitch or yawing moment at the focal point or resolving center 15, legs 12 are subjected to bending moments and since they are acting as columns, their resistance to bending is very low, therefore they will deflect and allow bulkheads 10 and 11 to move substantially within their parallel planes to produce a bending moment and accompanying deflection in beam 16 which can be measured by use of resistance wire strain gauges. By properly locating the gauges on the beam as hereinafter described, pitching moment and yawing moment may be measured without introducing the effects of one upon the other.

Immediately adjacent bulkhead 11, bulkhead 19 of rolling moment cage 7 is rigidly secured thereto in coaxial, abutting relationship by the same machine screws 20 which connect legs 12 to bulkhead 11 in cage 6. Bulkhead 21, the other of the pair of bulkheads in the rolling moment cage is spaced from bulkhead 19 in coaxial and parallel alignment. Legs 22, connecting bulkheads 19 and 21 are generally rectangular in cross-section as shown in Figure 6, wherein the major axis of the cross-section extends radially from the outer periphery of the bulkheads inward toward the center. The longitudinal axes of legs 22 are generally parallel to one another and generally perpendicular to the planes of the bulkheads. This construction allows limited rotation of bulkheads 19 and 21 with respect to one another within their given parallel planes upon application of relatively low rolling moments but will resist any other forces or moments tending to produce deflections in the cage. Tapered beams 23 and 24, substantially rectangular in cross-section, as shown in Figure 6, are fixedly carried at one of their ends as at 25, by bulkhead 19. The other ends of beams 23 and 24 are necked as at 25' immediately adjacent the integral connection 26 with bulkhead 21 so that they act as cantilever beams having the maximum moment adjacent the fixed end 25 and diminishing to nearly zero at neck 25' functioning as a pinned end. To realize the maximum deflection of beams 23 and 24 from the rotational movement of the bulkheads 19 and 21, they are located substantially parallel to each other adjacent the outer periphery of the bulkheads as shown in Figure 6.

Figure 11:
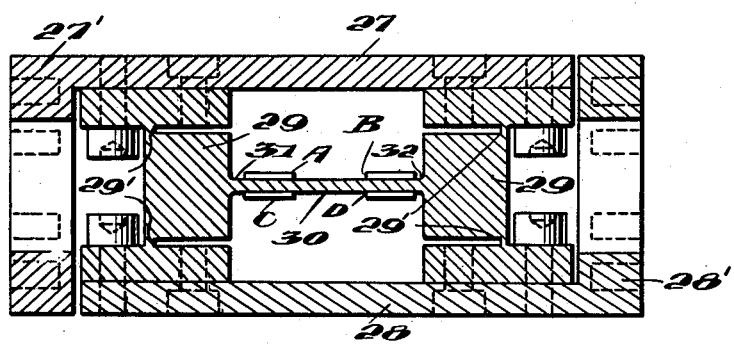
Figure 11 is a longitudinal sectional view of the drag cage.
Figure 12:
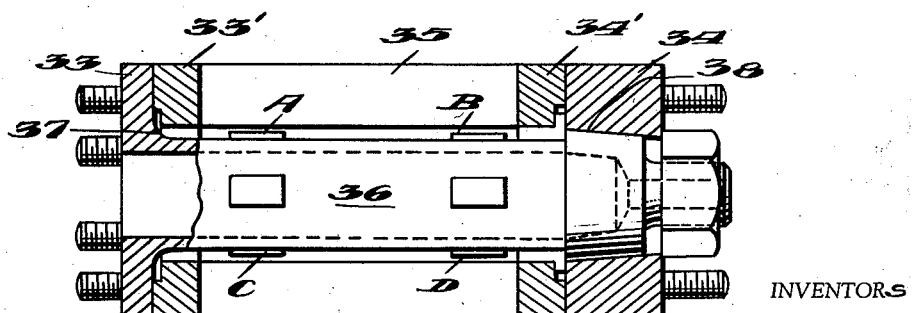
Figure 12 is a longitudinal sectional view of the lift and side force cage.

Drag cage 8 co-axially aligned with cage 7 includes a pair of transverse bulkheads 29 connected by legs 27 and 28 extending generally longitudinally therebetween. Legs 27 and 28 extend beyond bulkheads 29 on either end thereof to form axial abutments 27' and 28' normal to the axes of the legs. Abutments 27' and 28' are secured to adjacent bulkheads of rolling moment cage 7 and lift and side force cage 9 in co-axial, abutting relationship by machine screws 20. As best shown in Figure 11, bulkheads 29 are notched out and made very thin at 29' adjacent each of their ends. Straight beam 30, axially aligned within cage 8, is fixedly carried at its ends 31 and 32 by bulkheads 29. Relative movement of bulkheads 29 out of their given transverse planes will cause beam 30 to deflect an amount proportional to the relative movement of the bulkheads and hence proportional to the drag force applied to the cage. The construction of cage 8 is such that it will readily permit relative movement of the bulkheads upon application of drag forces, but will very efficiently resist other components of force or moment tending to move the bulkheads relative to each other.

Bulkhead 33 of lift and side force measuring cage 9 is rigidly secured to abutment 28' in coaxial and abutting relationship by machine screws 20. Bulkhead 34, the other of the pair of bulkheads in cage 9 is spaced from bulkhead 33 in coaxial and parallel alignment. Legs 35 are rigidly connected to bulkheads 10 and 11 by means of ring elements 33' and 34' formed integral with the legs and suitably secured to the bulkheads by the same machine screws 20 which join cage 9 with cage 8 and with sting 3. Straight beam 36 interposed between bulkheads 33 and 34 and legs 35 of lift and side force cage 9, is fixedly carried at 37 and 38 by bulkheads 33 and 34, extending generally normal thereto. Beam 36 is generally square in cross-section as shown in Figure 9. The legs 35 being generally parallel, effectively resist any moments acting about the resolving center 15 by pure tension and compression and therefore substantially no relative movement of the bulkheads results from such loading on cage 9. Drag forces will produce compression loads in the legs 35, but such a loading will not produce a measurable deflection in beam 36. A lift or side force acting at the resolving center will produce a bending moment in the legs 35 and since a column is weak in bending, a measurable deflection will be introduced in beam 36 by the movement of bulkheads 33 and 34 within their parallel planes. By properly locating the strain gauges on beam 36 as hereinafter described, the lift and side loads can be measured independently of one another.

The deflections induced into the beams of the balance by forces and moments acting on the model are proportional to the magnitude of the individual components of those forces and moments. By employing resistance wire strain gauges with suitable indicating means associated therewith, these deflections may be detected by changes in resistance and converted into force and moment component values directly without interaction. For maximum sensitivity, the strain gauges are placed on the beams as near as is practicable to the areas where the beam deflections are greatest.

Figure 13:
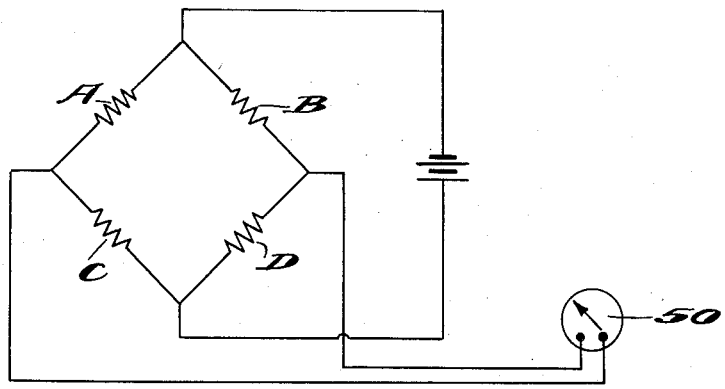
Figure 13 is a schematic diagram of the electrical bridge circuit employed in measuring the deflections of the beams.

Four wire resistance strain gauges A, B, C and D are employed for measuring each force or moment component. These strain gauges for measuring each component are arranged in a bridge circuit as shown schematically in Figure 13 wherein the letters A, B, C and D correspond to the strain gauge location in the circuit for any component. By arranging the gauges as indicated, temperature changes as well as certain types of deflections will not affect the balanced condition of the bridge.

In the case of beam 16 in the pitch and yawing moment cage 6, the strain gauges are placed on beam 16 as near as possible to the fixed end 17. These strain gauges on beam 16 for measuring pitching moment are located as shown in Figure 3 on opposed faces 39 and 40. The chief requirement in positioning these strain gauges on the beam is that each pair on a particular face must be an equal distance from the neutral axes of the beam developed from the individual pitch and yawing moments. When this is true, deflections due to a yawing moment may produce changes in the resistance wire strain gauges, but those changes will not be of such a relationship as to result in an unbalance of the bridge, therefore any yawing moment will not be indicated as a pitching moment by an unbalance of the pitching bridge circuit. The yawing moment gauges are mounted on the remaining two faces of the beam in a like manner.

The strain gauges for measuring rolling moment in the rolling moment cage 7 are secured to beams 23 and 24, which effectively act as cantilever beams as does beam 16 in cage 6. There are two beams for measuring one component and only four gauges are necessary to complete the bridge circuit, therefore gauges A, B, C and D are placed on the four faces of the beams as shown in Figure 6, as near the fixed ends 25 as possible. Any deflections of the beams will produce tension on one side and compression on the other, therefore, the bridge is completed so that the resistance in one leg of the bridge is increased and resistance in the other leg is decreased to produce an unbalance.

Beam 30 for measuring drag forces, and beam 36 for measuring lift and side forces are fixed on both ends as indicated hereinbefore and arranged so that when the force to be measured is acting upon the particular cage, the beam will deflect so as to produce a moment variation which passes through zero moment near the center of the span. Therefore on the same face of the beam, the moment at one fixed end will be positive and the moment at the other fixed end will be negative.

Figure 14:
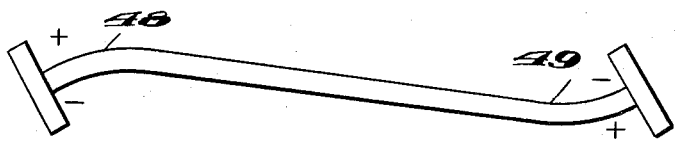
Figure 15:
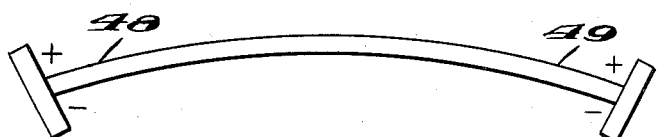

Figure 14 illustrates the manner in which beam 30 of cage 8 is adapted to deflect upon application of drag forces. The beam is fixed on both ends to members which move angularly but always remain in their parallel relationship. On the same face of the beam in Figure 14 it is clear that near one fixed end 48, the beam is under tension as indicated by a plus sign, and near the other fixed end 49, the beam is under compression as indicated by a minus sign. On the opposite face of the beam, tension and compression are also indicated by plus and minus signs. When the beam is deflecting under tension the resistance of the strain gauge is increased and when the beam is deflecting under compression, the resistance of the strain gauge is decreased. By arranging the strain gauges as indicated in the drawing, it is obvious that such a relationship will produce an unbalance condition in the bridge circuit of Figure 13. On the other hand, if the bulkheads should move angularly out of their parallel relationship as shown in Figure 15, caused by other forces or moments, each face of the beam will be under either tension or compression throughout its entire length and the two strain gauges carried on each face will be affected similarly, maintaining the bridge circuit in balance. Thus it is obvious that a drag reading will be obtained when the beam deflects as shown in Figure 14 but not when it deflects as shown in Figure 15. Strain gauges A, B, C and D are placed on the upper and lower faces 41 and 42 adjacent each fixed end as shown in Figure 2. The gauges are so connected in the bridge circuit that if gauge A's resistance is greater than the resistance in the neutral position, gauge B's resistance will be less than it normally is in the neutral position, or unloaded condition of the beam, when the beam deflects in such a manner as to produce a double curvature. This results in an unbalance of the bridge which is proportional the drag force. Other types of bending in beam 30 do not cause an unbalance in the bridge circuit as discussed hereinabove.

Figure 16:
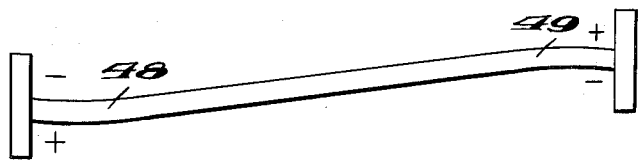
Figures 14, 15 and 16 illustrate, on an exaggerated scale, the manner in which a fixed end beam deflects.

Figure 16 illustrates the manner in which beam 36 in cage 9 is adapted to deflect upon application of lift and side loads. Beam 36 is fixedly secured to the bulkheads which remain in their parallel planes perpendicular to the longitudinal axis of the device. By moving one bulkhead with respect to the other in their parallel planes as indicated, the upper face of the beam is under compression at 48 and under tension at 49, and vice versa on the lower surface. If the bulkheads move angularly out of their parallel planes, as shown in Figure 15, the beam does not deflect so as to unbalance the bridge circuit shown in Figure 13. The gauges on beam 36 in cage 9, for measuring lift force are indicated by A, B, C and D, as shown in Figures 2 and 9. Due to the ends of the beam being fixed, any movement of the bulkheads within their given parallel planes, due to a lift load, will produce, say tension in the fibers of the beam adjacent gauge A and compression in the fibers of the beam adjacent gauge B. The same relationship will hold for fibers in the beam adjacent gauges C and D. If tension stresses occur on face 43 along the span of beams 36 adjacent gauges A and B, the bridge would remain in the balanced condition and would give no reading. Therefore, any angular movement of bulkheads 33 and 35 out of their given parallel planes, due to any moment loading at the resolving center, will not produce the type of deflection in beam 36 which is measurable through the strain gauge bridge circuit. By mounting the strain gauges so that they bisect and run parallel with the neutral axis designated by a side load, any side load causing deflection in the beam will completely cancel out in each lift gauge and therefore not unabalance the lift force bridge circuit. The gauges for measuring side load are mounted on the remaining two sides of beam 22 in the same manner as the lift gauges are mounted, that is, parallel with and bisecting the neutral axis of the beam developed by a lift load. Since the beam is generally square in cross-section, when the gauges are centered on the faces, they will bisect the neutral axes.

There are two lead wires (not shown) running from each strain gauge which must be fed through the interior of the instrument and out its rearward end. To provide a path for these many wires, bulkhead 11, as shown in Figure 4 has cut out portions 44, formed adjacent its outer periphery through which the wires of the strain gauges on beam 16 may be fed. Bulkhead 19, as shown in Figure 5, abutting bulkhead 11 as shown in Figure 2, has channels 45 communicating with cut out portions 44 which extend radially from its outer periphery, inward toward the center through which the wires of the strain gauges on beam 16 may pass. The center of bulkhead 21 and abutments 27' and 28' are removed for the passage of strain gauge wires as indicated by Figures 6 and 8. Channels 46 in abutment 28', as shown in Figure 8 extend radially from the open center, outward to the periphery, and communicate with cut out portions as 47 in bulkhead 33, as shown in Figure 9. Bulkhead 34 on the extreme rearward end of the balance has cut out portions identical with those in bulkhead 33, as shown in Figure 9, through which the wires may pass from the balance. The strain gauge wires are not shown in the drawing in order that the balance may be more clearly illustrated without sacrificing the showing of structural details which are of greater importance.

The model center of gravity is made co-incident with the resolving center 15 of balance 1, in accordance with the requirements for the installation shown in Figure 1. The resultant force and moment appearing at the resolving center must be resolved into the desired components, namely pitching moment, yawing moment, rolling moment, side load, lift load and drag. The longitudinal axis of the balance establishes one of the three axes about which the force and moment components are measured. In order to prevent interaction of the forces and moments on the beams of the balance, the construction of the cages are such that any movement of the pairs of bulkheads relative to each other is negligible upon application of certain forces or moments, while the bulkheads will move relative to one another upon application of other forces or moments. By locating the strain gauges on the beams as described, any undesired deflections which might possibly occur in the beams from an unusual loading condition causing the certain forces or moments to move the pairs of bulkheads relative to each other, will not be the type of deflection which will unbalance the bridge circuits.

The pitching and yawing moment cage receives the resultant force and moment acting on the model, deflects an amount proportional to the magnitude of the desired moments and simultaneously transmits the resultant force and moment into the next adjacent cage which reacts to rolling moment component which in turn transmits the resultant force and moment into the following cage and so on until all of the components of force and moment have induced a deflection in the appropriate beam of the balance which is measurable in terms of the magnitude of the component forces and moments by the amount of unbalance in the strain gauge bridge circuits. By calibration, electrical voltage measuring devices as 50 can be made to read the bridge unbalance directly in terms of the particular force or moment. This is made possible by the fact that only one particular component will produce an unbalanced condition in the bridge circuit adapted for measuring that component.

It is to be understood that certain changes, alterations, modifications and substitutions can be made without departing from the spirit and scope of the appended claims.

We claim as our invention:

1. A strain gauge balance adapted to be received in an aperture within the body of a model for measuring component forces and moments applied thereto within a wind tunnel, said balance comprising a plurality of cages arranged in co-axial alignment, the rearwardmost cage being rigidly mounted to said tunnel for supporting said balance, the forwardmost cage being carried by said rearwardmost cage and rigidly connecting with said model and providing support therefor, each said cage including a pair of bulkheads spaced apart in co-axial and generally parallel alignment, legs connecting said bulkheads so as to offer low resistance to relative movement thereof upon application of desired force or moment components and to offer high resistance to relative movement thereof upon application of undesired force or moment components, structural elements carried by said pairs of bulkheads within said cages so as to deflect in accordance with the relative movement of said bulkheads, and strain gauge means carried by said cages and responsive to deflection of said elements for measuring said deflections and determining the magnitude of said desired force or moment components acting thereon.

2. A strain gauge balance adapted to be received in an aperture within the body of a model for measuring forces and moments applied thereto within a wind tunnel, said balance being rigidly mounted at one end to said tunnel and at the other end to said model and comprising a plurality of cages arranged in end to end relationship, each said cage including a pair of bulkheads spaced apart in generally co-axial and parallel alignment, legs connecting said bulkheads so as to offer low resistance to relative movement thereof upon application of desired force or moment components and to offer high resistance to relative movement thereof upon application of undesired force or moment components, structural elements carried by said bulkheads within said cages so as to deflect in accordance with the relative movement of said bulkheads, and strain gauge means carried by said cages and responsive to deflection of said elements for measuring said deflections and determining the magnitude of said desired force or moment components acting thereon.

3. A strain gauge balance adapted to be received in an aperture within the body of a model for measuring component forces and moments acting thereon within a wind tunnel, said balance being rigidly supported at one end by said tunnel, its opposite end extending forwardly to support said model, said balance comprising a plurality of cages arranged in end to end relationship and adapted for operation exclusive of interaction therebetween, each said cage including a pair of bulkheads spaced apart in generally co-axial and parallel alignment, legs connecting said bulkheads so as to provide low structural efficiency upon application of desired force or moment components and high structural efficiency upon application of undesired force or moment components whereby relative movement of said pairs of bulkheads is effected by said desired component forces or moments without interaction by said undesired components, structural elements carried by said bulkheads within said cages so as to deflect in accordance with the relative movement of said bulkheads, and strain gauge means carried by said cages and responsive to deflection of said elements for measuring said deflections and determining the magnitude of said certain forces and moments acting thereon.

4. A direct reading strain gauge balance for measuring component forces or moments comprising a pair of bulkheads spaced apart in generally co-axial and parallel alignment, a plurality of legs extending in planes generally normal to the planes of said bulkheads and connecting therewith to form a cage, said bulkheads being adapted to move relative to each other upon movement of said legs caused by application of certain component forces or moments, a generally straight beam axially aligned within said cage and fixedly carried at one end by one bulkhead and effectively pinned at its opposite end to the other bulkhead so as to deflect substantially as a cantilever beam upon relative movement of said bulkheads, strain gauges secured to said beam adjacent its fixed end, said gauges being located on opposite faces of said beam and arranged in a quadrilateral bridge circuit so as to unbalance said bridge in proportion to the force or moment causing said deflection, and means for measuring said bridge unbalance directly in terms of said force or moment.

5. An instrument for measuring only certain components of resultant forces and moments acting thereon, said instrument composing a plurality of bulkheads arranged in generally co-axial and parallel alignment, adjacent pairs of which are joined by legs extending in planes generally normal thereto to form cages, said legs having a cross-sectional shape providing low structural efficiency upon application of desired component forces or moments and high structural efficiency upon application of undesired component forces or moments whereby relative movement of said pairs of bulkheads is effected by said desired component forces or moments without interaction by said undesired components, a generally straight beam extending axially within each said cage and connecting at either end with said bulkheads so as to deflect in proportion to the magnitude of the component forces or moments causing the relative movement of said bulkheads, and means carried by said cages and responsive to deflection of said beams for measuring said beam deflections in terms of the magnitude of said component forces or moments.

6. A direct reading strain gauge balance instrument for measuring component forces or moments acting thereon comprising a cage having a pair of bulkheads spaced apart in generally co-axial and parallel alignment, legs extending axially between said bulkheads and connecting therewith so as to allow relative movement of said bulkheads upon application of certain component forces or moments and to substantially prevent relative movement thereof upon application of other component forces and moments, a generally straiaght beam axially carried within said cage and fixedly connected at either end to said bulkheads so as to deflect in accordance with the relative movement thereof, strain gauges secured to said beam adjacent either end thereof, their axes extending generally parallel to the axis of said beam, said gauges being arranged in a quadrilateral bridge circuit having one gauge for each leg of said bridge, said bridge being unbalanced by deflections producing a double curvature in said beam and remaining in balance by deflections not producing said double curvature.

7. A direct reading strain gauge balance instrument for measuring component forces or moments acting thereon comprising a pair of bulkheads spaced apart in generally co-axial and parallel alignment, legs connecting said bulkheads so as to provide low structural efficiency upon application of desired component forces or moments and high structural efficiency upon application of undesired component forces or moments whereby relative movement of said bulkheads is effected by desired component forces and moments without interaction by said undesired components, a generally straight beam extending axially between said bulkheads and connecting therewith so as to deflect in proportion to the relative movement of said bulkheads, strain gauges secured to said beam on opposed surfaces thereof, said gauges being arranged in a quadrilateral bridge circuit so as to unbalance said bridge in proportion to the relative movement of said bulkheads, and means for measuring said unbalance directly in terms of the force or moment component acting to cause said relative movement.

8. An instrument for measuring component forces and moments developed by relative motion of a solid body in a fluid medium, said instrument comprising a plurality of cages arranged in end to end relationship each having a pair of bulkheads spaced apart in generally co-axial and parallel alignment, legs extending between said bulkheads and rigidly attached thereto so as to offer low resistance to relative movement of said bulkheads upon application of desired component forces or moments and to offer high resistance to prevent relative movement of said bulkheads upon application of other component forces or moments, elements carried by said bulkheads within said cages so as to deflect in accordance with the relative movement of said bulkheads, and means carried by said cages and responsive to deflection of said elements for measuring said deflections quantitatively to determine the magnitude of the forces or moments applied.

9. A strain gauge balance adapted for supporting a model and measuring component forces and moments acting thereon within a wind tunnel, said balance being rigidly mounted at one end to said tunnel and at the other end to said model, said balance comprising a pair of bulkheads spaced apart in generally co-axial and parallel alignment, legs connecting said bulkheads so as to offer low resistance to relative movement thereof upon application of desired component forces or moments and to offer high resistance to prevent relative movement thereof upon application of other component forces or moments, a generally straight beam interposed between said legs and bulkheads and fixedly carried at either end by said bulkheads so as to deflect in accordance with the relative movement thereof, and strain gauge means carried by said beam for measuring said deflections caused by relative movement of said bulkheads.

10. A six component wind tunnel balance comprising a plurality of interconnected legs and transverse bulkheads spaced axially along said balance, a plurality of said legs rigidly connecting a first pair of said bulkheads, and having their longitudinal axes arranged to intersect at a point about which moments are to be measured whereby to permit substantial relative movement of said pair of bulkheads only in response to pitch and yaw moments acting about said point, a pitch and yawing moment beam generally square in cross-section extending co-axially with said balance between said first pair of bulkheads, said beam connecting with said bulkheads whereby relative movement therebetween produces corresponding deflections in said beam, a plurality of said legs extending substantially axially of said balance and having their major cross-sectional axes extending generally radially with respect to said balance axis and rigidly connecting a second pair of said bulkheads whereby to permit substantial relative movement of said second pair of bulkheads only in response to rolling moments about said balance axis, a pair of rolling moment beams generally rectangular in cross-section extending axially of said balance between said second pair of bulkheads, said rolling moment beams connecting with said second pair of bulkheads whereby relative movement therebetween produces corresponding deflections in said beam, the major cross-sectional axes of said pair of rolling moment beams intersecting the axis of said pitch and yawing moment beam so as to offer minimum resistance to relative rotational movement of said second pair of bulkheads, a pair of said legs rigidly connecting a third pair of said bulkheads on either side of said axis, one of said pair of legs extending longitudinally beyond one of said third bulkheads and the other of said pair of legs extending longitudinally beyond the other of said third bulkheads, said pair of legs constituting the sole means for applying forces to said third pair of bulkheads, said pair of legs permitting substantial relative movement of said bulkheads only in response to axial forces, a drag force beam co-axially aligned with said pitch and yawing moment beam and carried by said third pair of bulkheads so as to deflect in accordance with the relative movement therebetween, and a plurality of said legs arranged parallel to said balance axis and rigidly connecting a fourth pair of said bulkheads whereby to permit substantial relative movement of said bulkheads only in response to said lift and side forces, a lift and side force beam generally square in cross-section connecting with said fourth pair of bulkheads and extending co-axially with said pitch and yawing moment beam, said two last mentioned beams being so oriented that the surfaces of said lift and side force beam lie in planes parallel with the surfaces of said pitch and yawing moment beam whereby deflections in said beams represent components about two mutually perpendicular axes, and strain gauges carried on said beams for detecting the relative value of each of said component forces and moments.

11. An instrument capable of measuring six different components of a resultant loading simultaneously, said instrument being specially adapted to perform as a high-speed wind tunnel balance for measuring resultant forces and moments acting on a test model in terms of certain desired components, said instrument comprising a plurality of cages rigidly connected to one another in generally co-axial alignment for transmitting forces or moments therethrough, each said cage including a pair of transverse bulkheads at either end thereof, one said cage having legs joining said bulkheads in planes generally normal thereto, the axes of said legs extending to intersect at a point beyond said cages about which said resultant moments are resolved, other said cages having legs extending axially between said bulkhead and connecting therewith, said legs providing low structural efficiency upon application of desired components of force or moment and high structural efficiency upon application of other components of force and moment whereby relative movement of said pairs of bulkheads is effected by said desired components without interaction by said other components, generally straight beam elements axially carried within said cages and connecting with said pairs of bulkheads so as to deflect in accordance with the relative movement therebetween, and means carried by said cages and responsive to deflection of said beams for measuring said beam deflections directly in terms of the component force or moment causing said relative movement.

12. An instrument for measuring force components acting normal to its axis comprising a pair of bulkheads spaced apart in generally co-axial and parallel alignment, generally parallel legs extending longitudinally between said bulkheads and rigidly connecting therewith whereby to permit substantial relative movement between said bulkheads only in response to said normal force components, a beam rigidly connecting with said bulkheads and having its longitudinal axis substantially coincident with said bulkhead axis, said beam being adapted to deflect responsive to relative movement between said bulkheads, and means responsive to said beam deflections for determining the magnitude of said normal force components, including a pair of strain gages carried by said beam adjacent each end thereof, the strain gages of each said pair being arranged on opposite sides of said beam.

13. An instrument for measuring the torsional moment component of a resultant loading comprising a pair of bulkheads spaced apart in generally co-axial and parallel alignment, a plurality of legs extending substantially axially between said bulkheads and rigidly connecting therewith, the major cross-sectional axis of said legs extending generally radially with respect to said bulkhead axis whereby to permit substantial relative movement of said bulkheads only in response to said torsional moments, a pair of beams connecting with said bulkheads, the longitudinal axes of said beams being spaced from said bulkhead axis and extending generally parallel therewith, said beams being adapted to deflect responsive to relative movement between said bulkheads, and means responsive to said beam deflections for determining the magnitude of said torsional moment component.

14. An instrument for measuring moment components of a resultant loading comprising a pair of bulkheads spaced apart in generally co-axial and parallel alignment, a plurality of legs rigidly connecting said bulkheads, and having their longitudinal axes arranged to intersect at a point about which said moments are to be measured whereby to permit substantial relative movement of said pair of bulkheads only in response to moments about said point, a beam connecting with said bulkheads and adapted to deflect responsive to relative movement thereof, and means responsive to deflections of said beam for determining the magnitude of said moment components.

15. An instrument for measuring axial force components comprising a pair of bulkheads spaced apart in generally co-axial and parallel alignment, a pair of legs rigidly connecting said bulkheads, one of said legs extending beyond said bulkheads in one direction and the other of said legs extending beyond said bulkheads in the opposite direction for transmitting said axial forces, said bulkheads being adapted for substantial relative movement only in response to said axial forces, a beam axially extending to connect with said bulkheads and adapted to deflect responsive to relative movement thereof, and means responsive to said beam deflections for determining the magnitude of said axial forces.

References Cited in the file of this patent

UNITED STATES PATENTS

| | | |
|---|---|---|
| 2,405,199 | Faust et al. | Aug. 6, 1946 |
| 2,458,481 | Ruge | Jan. 4, 1949 |
| 2,485,977 | Mains | Oct. 25, 1949 |

FOREIGN PATENTS

| | | |
|---|---|---|
| 717,708 | Germany | Feb. 20, 1942 |
| 590,707 | Great Britain | July 25, 1947 |